July 7, 1964  D. C. SIEVERS ETAL  3,139,745
GAS CHROMATOGRAPHIC UNIT

Filed Dec. 8, 1960  4 Sheets-Sheet 1

DOUGLAS C. SIEVERS
JOHN N. ROPER JR.
INVENTORS

BY R. Frank Smith
Abram W. Hatcher

ATTORNEYS

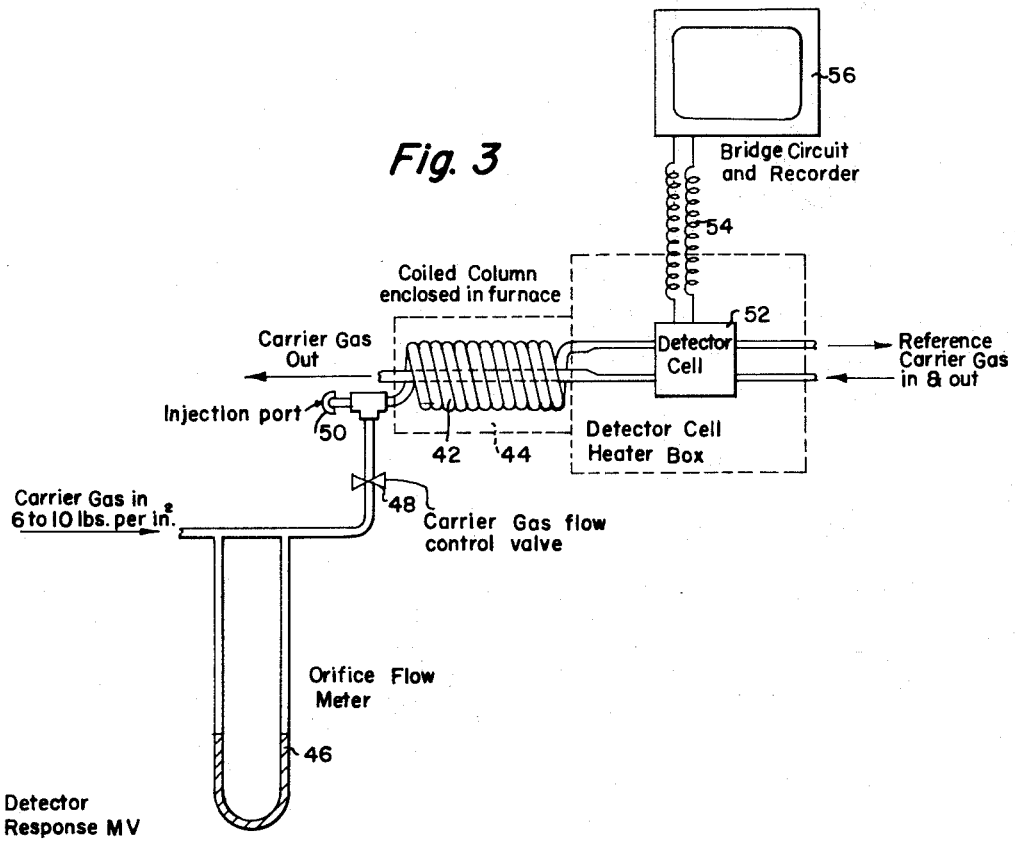
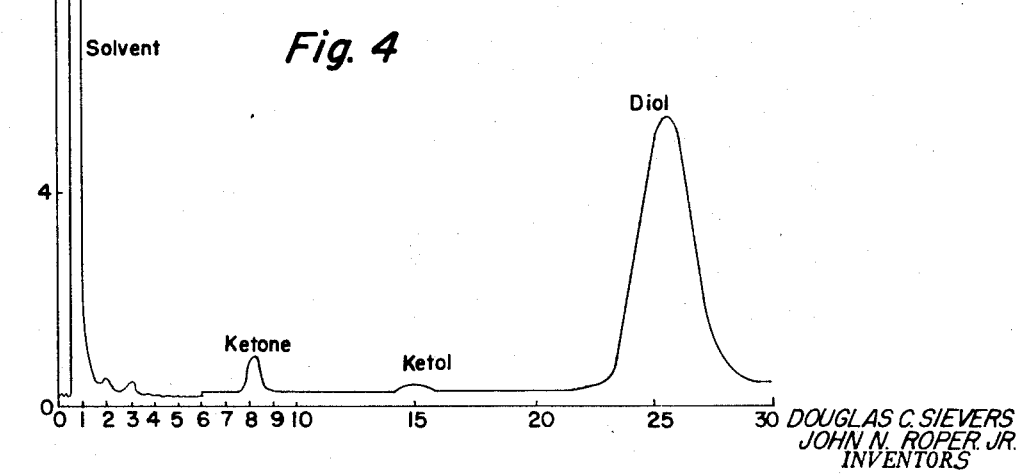

July 7, 1964  D. C. SIEVERS ETAL  3,139,745
GAS CHROMATOGRAPHIC UNIT
Filed Dec. 8, 1960  4 Sheets—Sheet 3

DOUGLAS C. SIEVERS
JOHN N. ROPER JR.
INVENTORS

BY R. Frank Smith
Abram W. Hatcher

ATTORNEYS

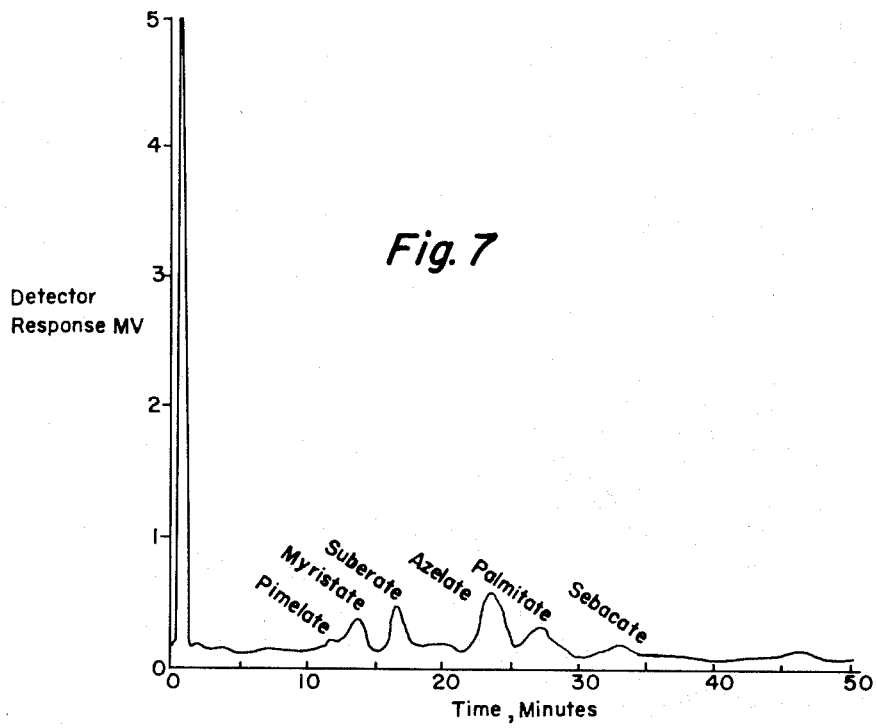
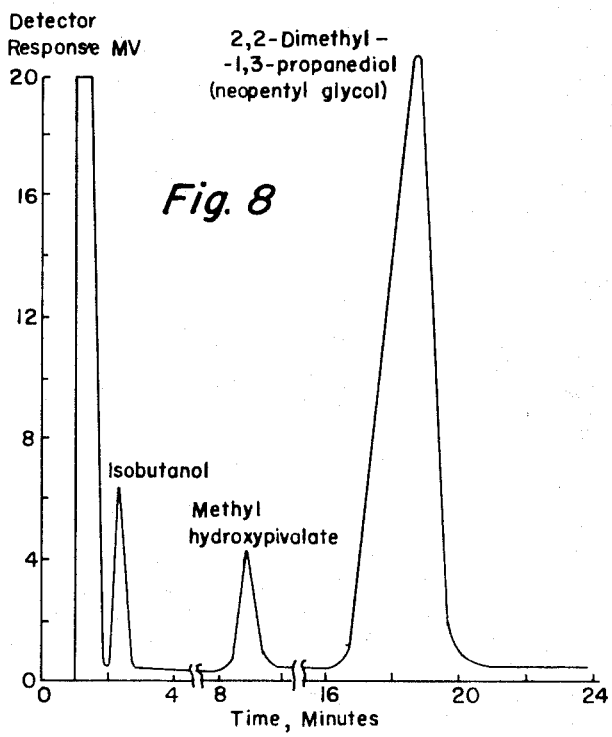

United States Patent Office 3,139,745
Patented July 7, 1964

3,139,745
GAS CHROMATOGRAPHIC UNIT
Douglas C. Sievers and John N. Roper, Jr., Kingsport, Tenn., assignors to Eastman Kodak Company, Rochester, N.Y., a corporation of New Jersey
Filed Dec. 8, 1960, Ser. No. 74,525
4 Claims. (Cl. 73—23.1)

This invention relates to gas chromatographic method and apparatus. More particularly, this invention concerns a method and apparatus for heating a gas or admixture of gas and vapor to the temperature required for analysis thereof or separation of the components thereof by gas or gas-liquid chromatography.

The need for accurate analysis of all types of chemical compositions is especially great in this day of large-scale commerical production with its strict requirements as to production purity, both of the reagents used and the compositions produced. Gas chromatography is perhaps the most recent technique to be used, and consequently has not yet been developed to a state where it can be used efficiently in all types of commercial production. The term gas chromatography as used here and hereinafter also includes gas-liquid and gas-vapor chromatography. The general procedure in gas chromatography is to adsorb the material to be separated in a narrow band on one end of a column of adsorbent such as activated charcoal, silica gel, alumina, or the like. In gas-vapor mixtures, an inert support coated with a high-boiling liquid is commonly used. The sample to be analyzed or separated is caused to move in one of several ways through such a column. It may be caused to move through the column by (1) application of heat, (2) passage of a carrier gas through the column, otherwise known as elution, (3) passage of a carrier gas containing a strongly adsorbent vapor through the column, otherwise known as displacement, or some combination of these methods. By any one of these methods it is possible to produce sufficiently different rates of migration of the various components of a mixture to separate them and permit their detection or collection as they emerge from the column. Gas chromatographic methods have been applied to analyses of small quantities of materials produced during kinetic studies, fluorinated compounds, hydrocarbons in automobile exhause gases, mixtures of methyl ketones, general mixtures of hydrocarbons, some of the components of cigarette smoke, ester-type plasticizers, and the like.

In most cases, the analysis of gases and relatively low-boiling liquids has been involved, and it has thus been necessary to heat the gas chromatographic columns, in some cases to temperatures as high as to 500° C. Although, generally, a relatively simple arrangement has been possible for detecting the various components as they emerge from the column, for example, thermal conductivity cells constructed such that 4 filaments are connected electrically to form the arms of a Wheatstone bridge, two of which are exposed to the mixture of carrier gas and the component leaving the column to produce an unbalanced voltage for recording on an automatic-plotting potentiometer, all methods of heating the column to date have proved relatively unsatisfactory. For instance, heating units of the prior art in general require considerable time to bring the column to the required temperature and are of such a bulky arrangement that it is difficult to change columns rapidly. The main problem appears to have been to get the necessary temperature stability needed for keeping the detector cell, such as the one just described, at a closely regulated temperature and to permit the quick heating and cooling desired. Large heat-sinks in the form of a well insulated block of metal or bulk of air have been used, and it has been necessary to lag the box housing the apparatus heavily with considerable amounts of insulating materials such as glass wool, asbestos, magnesia, foam glass, and other bulky materials. Such an apparatus has considerably complicated the replacement and repacking of columns, and rapid cooling has necessitated bulky fans, or cooling coils and such, thereby considerably increasing the size of apparatus and the amount of space required. In fact, large heat-sinks such as the abovementioned have effected a general slowing up of the heating process and have required the employment of high-wattage heaters.

Therefore, it is apparent that providing a procedure for rapid heating and cooling in gas chromatographic work and for maintaining a reasonably constant temperature represents a highly desirable result. After extended investigation, we have discovered a method and apparatus which will accomplish this result.

One object of this invention is to provide a radiant-heated, gas chromatographic-column unit capable of rapid and uniform heating. Another object is to provide a method for confining the heat required to bring a gas chromatographic column to the required temperature to a relatively small, effective area. A further object of the invention is to provide a compact heating arrangement for analysis by gas chromatographic methods. Another object is to provide a gas chromatographic unit wherein the column or columns can be easily repacked and/or replaced. Still another object is to provide apparatus for heating a gas chromatographic column simply, efficiently, and economically with a relatively low power requirement. A further object of this invention is to provide gas chromatographic apparatus which can be easily opened for cooling.

In the broader aspects of the present invention, the above objects are accomplished by means of a radiant heating unit which uses mirror surfaces to reflect and confine the heat and a dead-air space for a buffering effect for heating a gas chromatographic column. We have found that a cylindrical tube split and hinged in such a way as to allow it to open lengthwise can be effective in allowing the apparatus to cool rapidly and in permitting replacement and repacking of the columns. The tube may be made of stainless steel or other suitable material. Our chromatographic column in general is a coiled column enclosed within a radiant heating unit wherein the heating wires are wound spirally around rods extending lengthwise and arranged concentrically radially outward from the centrally located column. An axially located return channel is provided for the carrier gas returning from the detector cell, which may be located within a separate heater box to which our heater unit may be readily attached. The inside surface of the cylindrical box surrounding the coiled column has a polished or mirror-like surface for the reflection of the heat supplied from the spirally arranged electric wires. In one embodiment of our invention our radiant heating unit is arranged in such a way as to heat a gas-liquid partition chromatographic column to the proper temperature. In this procedure or arrangement the substance to be separated is moved by means of a gas stream through a column packed with granules of a solid covered with a high-boiling liquid. Each sample component distributes itself between the gaseous and liquid phases and that portion in the gaseous phase at any time moves with the gas stream. Each substance generally moves at a different rate and emerges from the column at a different time to be monitored by a sensing device such as a thermal conductivity cell. The gas-chromatographic column-heater unit may be used for both gas and liquid-gas chromatographic work. In other words, the sample analyzed may be a gas or substance normally occurring as a gas, a liquid or substance normally occurring as liquid, or vapor or substance normally occurring as a liquid which has been vaporized or evaporated to a vapor. The temperature may be controlled accordingly. The particular medium or packing used in the column depends in general upon the material to be analyzed and may be a solid adsorbent, a solid adsorbent supporting a partitioning liquid as in the above embodiment, or a capillary wall supporting a partitioning liquid. Our process and apparatus can be used to equal advantage in elution, displacement or other method of gas or gas-liquid chromatographic analysis.

For a further understanding of our invention, reference will be made to the attached drawings forming a part of the present application.

FIGURE 3 is a semi-schematic drawing of the gas chromatographic heating unit of this invention showing its relationship to the entering sample and carrier gas and a detector cell connected to a bridge circuit and recorder.

FIGURES 4 to 8 are graphs plotting detector response in millivolts versus time in minutes respectively for (1) a ketone-ketol-diol-solvent sample, (2) a mixture of various hydrocarbons with carbon dioxide, hydrogen, and oxygen, (3) a mixture of various esters, (4) a mixture of methyl esters of acids resulting from the oxidation of oleic acid, (5) a sample containing the products resulting the hydrogenation of hydroxy pivalaldehyde. The analyses represented by the graphs of FIGURES 4 to 8 inclusive were made in accordance with the method of this invention, as will be more specifically described in the examples given hereinafter.

Figure 1:
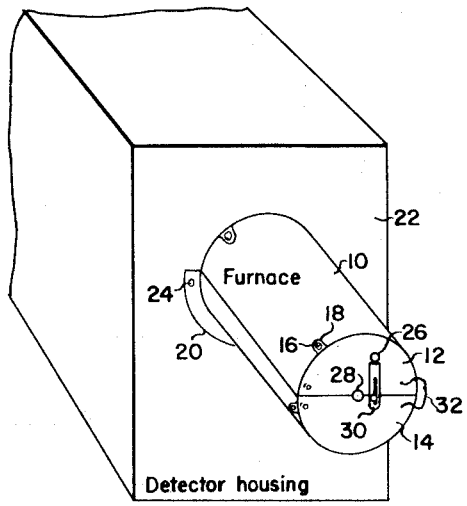
FIGURE 1 is an external view in perspective of the heating unit of this invention attached to a detector housing.

Referring to FIGURE 1, the round end of the heating tube 10 is closed with stainless-steel split circles 12, 14 attached by means of screws 16 through overlapping ears 18. The detector-housing end of the heating unit 10 contains a flange 20 for attachment to a thermostatted detector heater box 22 by means of sheet-metal screws 24. The split-circle end pieces 12, 14 at the opposite end of the heating unit 10 are slotted to accommodate the tubing going to and from the chromatographic column (not shown) which enters at orifice 26 and leaves at orifice 28 within the heating unit 10 so that the unit 10 may be opened for rapid cooling while the column is in place. A slotted-adjustable supporting member 30 is attached to end piece 14 to hold the end of the chromatographic column tubing in place. At the hinged side of end pieces 12, 14, the ends of Nichrome (nickel-chromium alloy produced by Driver Harris) heater wire are connected to a stranded, ceramic-bead insulated, copper wire 32 which joins the upper and lower units within the heating unit. These connections may be silver-soldered and covered with an appropriate insulating adhesive composition for protection. Near the periphery of end pieces 12, 14 of the front of the heating unit and adjacent to the portion where the heating unit is slotted for opening are located connector knobs which accommodate lead-in wires from a variable-voltage transformer (not shown) to the heating unit.

Figure 2:
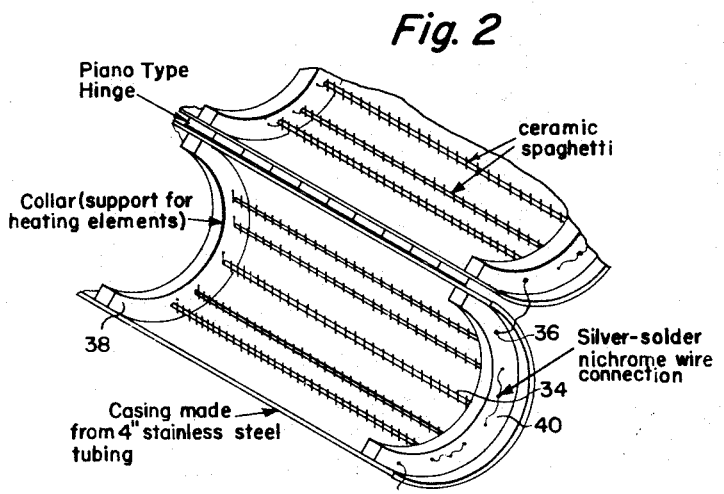
FIGURE 2 is a transverse view of the heating unit hinged open.

Referring next to FIGURE 2, a plurality of heating elements 34 are arranged concentrically adjacent the internal curvature of the heating unit. Each element 34 may be made from a 17-in. length of No. 23 Nichrome wire wound as close together as possible on an 1/8-in. outer diameter rod and then stretched, after removal from the rod, to the desired length. The supporting rods, used in the heating unit, may be made of 3/32-in. outer-diameter ceramic spaghetti. These are slid into the thus spirally wound wire, and the ends of the wire are fitted through holes 36 in Transite (Johns Manville hard broad-type material made from asbestos and Portland-type cement) collars 38 and 40 spaced approximately 3/16-in. from the ends of the heating unit to allow space for the wire connections, which may be made with silver solder.

The collars 38 and 40 may be bolted to the heating unit. The heating elements 34, when connected in series, each having an effective length of about 16-in., furnish a power rating to the heating unit of approximately 500 watts. We have found that 500 watts per foot of our furnace length will supply the necessary heat for gas chromatographic purposes. The heating unit is preferably highly polished or plated both inside and out. Instead of polishing the inside surfaces of the outer wall of the heating unit, heavy aluminum foil may be placed thereagainst and held in place by the Transite collars 38 and 40. Either arrangement provides the necessary mirror surface.

Referring now to FIGURE 3, the carrier gas enters coiled column 42 located within heating unit 44 by way of orifice flow meter 46 and carrier gas flow control valve 48. The liquid sample is injected by means of a syringe or other appropriate injection device through injection port 50 and is carried by the carrier gas through the chromatographic column 42. The various components of the gas as they emerge from the column 42 pass through detector cell 52, which may be of the above-mentioned thermal conductivity type or other appropriate type of the prior art. The various peaks made by the bridge circuit are traced by the recorder 56. The working temperature limits of the heating unit of the gas chromatographic system of this invention are from room temperature to above 500° C. The size of the heating unit may be varied to fit any length of the chromatographic column required, but in many instances a length not exceeding 25 ft. is used. A 6-ft. length is quite often sufficient.

A further understanding of our invention will be had from a consideration of the following examples which are set forth for illustrating certain preferred embodiments.

*Example I*

The ability of the heating unit of this invention to obtain a proper gas chromatographic column temperature within a minimal time and to cool rapidly when desired was demonstrated as follows:

(1) A thermocouple was placed against a chromatographic column tube such as that pictured in FIGURE 3 on the inner surface of the coil away from the heating units in order for the temperature of the column to be measured without any influence from the direct radiation of the heating elements.

(2) To simulate normal operating conditions a sample vaporize tube heater was used, being turned on at the same time as the chromatographic tube heating unit and being set to heat to 235° C.

Numbers 1 and 2 are conditions which apply to each of the runs described in 3, 4, and 5.

(3) With a setting of 70 volts on the variable voltage transformer and an initial temperature of 40° C., the column temperature was raised to 250° C. in 9½ minutes.

(4) With a setting of 60 volts on the variable voltage transformer and an initial temperature of 33° C., the column temperature was raised to 186° C. in 7 minutes. With manual adjustment of the voltage settings on the variable voltage transformer, it required 25 minutes to get a straight base line at 186° C. in this same run.

(5) With the column temperature at 190° C., the furnace and the vaporizer tube heater were both turned off and the furnace was opened. Within 20 minutes the column temperature was 40° C. without the aid of blowing air thereon.

*Example II*

A ketone-ketol-diol-solvent mixture was analyzed in a gas chromatographic column heated in accordance with our invention. The gas chromatographic column was 6 ft. long and made of ¼-inch aluminum tubing. The column was packed with 20% Carbowax 20 M (a high molecular weight polyethylene oxide produced by Union Carbide) on 35 to 60 mesh Chromosorb (a diatomaceous earth product of Johns-Manville). Hydrogen carrier gas was introduced through a control valve such as that indicated in FIGURE 3 at the rate of 55 ml./min. The gas chromatographic column was heated within a few minutes to 140° C. by a heating unit such as that pictured in FIGURES 1 and 2. Twenty microliters of the sample were injected by means of a hypodermic needle through an injection port such as that pictured in FIGURE 3. As the various components emerged from the coiled chromatographic column and passed through the detector cell, various peaks were recorded in millivolts versus minutes of operation by a bridge circuit and recorder arranged as in FIGURE 3. The results of the analysis are given in FIGURE 4, which shows the various peaks recorded from the various solvent, ketone, ketol, and diol components together with certain other unidentified minor fluctuations. In this example, as in the other examples of this invention, in general the identity of a separated component is based upon the time required for it to pass through the chromatographic column, as is indicated by the respective graphs of FIGURES 4 to 8, representing respectively the results of the tests made in accordance with Examples II through VI. The height of the various elution peaks and the area under each peak are generally proportional to the amount of the substances that produced the peak.

*Example III*

Figure 5:
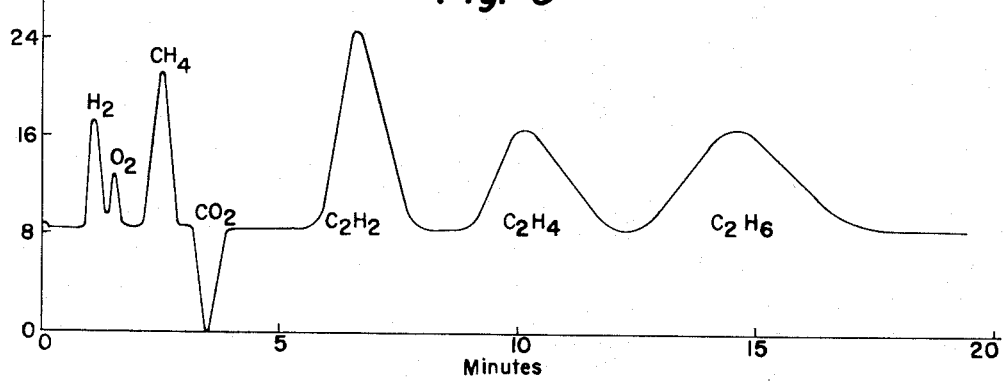
Figure 6:
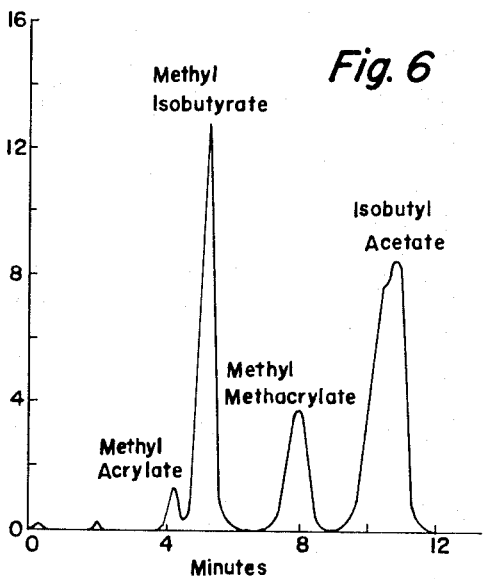

A sample containing a mixture of hydrocarbons with certain other gases, including hydrogen, oxygen, and carbon monoxide, was passed through the gas chromatographic adsorption apparatus of our invention in accordance with the procedure of Example II with the exception that in this case the column consisted of ¼-inch glass tubing and was 4½ ft. long, the packing was 30- to 50-mesh activating charcoal, the carrier gas was nitrogen, the rate at which the carrier gas was introduced was 50 ml./min., the temperature was 180° C., and the sample consisted of 10 ml. of gas. The detector response is indicated in FIGURE 5, with the various peaks for the individual components of the sample shown thereon.

*Example IV*

A mixture of various esters was passed through the heating unit gas chromatographic column of our invention in accordance with the procedure of Example II with the exception of the following changes: 11 $\mu$l. of sample were used, the temperature to which the gas chromatographic column was heated by the heating unit was 74° C., the flow rate of hydrogen carrier gas was 60 ml./min., and the column consisted of 4 ft. of ¼-inch stainless-steel tubing packed with 30% tri-metal-tolyl phosphate on 30 to 70 mesh Celite 545 (Johns-Manville diatomaceous earth). A graph of the detector response in millivolts versus the time of operation in minutes is given in FIGURE 6, wherein peaks of the various components of the various mixtures are indicated.

*Example V*

A mixture of methyl esters produced by the oxidation of oleic acid was introduced to and passed through a heating unit-chromatographic column arrangement such as that given in FIGURE 3 in accordance with the procedure of Example II except that the sample size in this case was 20 $\mu$l., the temperature to which the column was heated was 191° C., the flow rate was 45 ml. of $H_2$/min., and the chromatographic column consisted of an 8-ft. length of ¼-inch tubing packed with Craigg polyester succinate (a condensation polymer of 1,4-butanediol and succinic acid) on 35–80 mesh Chromosorb. Peaks for the various ester components of the mixture were recorded on a graph of the detector response in millivolts versus time in minutes and are given in FIGURE 7.

One of the advantages of the present invention is its capability of being used for temperature programming. In this procedure the column temperature is gradually increased while the detector temperature is held constant, thus shortening the overall time required for a gas chromatographic analysis, giving better separation of the low-boiling components as indicated by earlier peaks on the detector graphs, and causing better-shaped final peaks of such a clarity that the analysis can be made in more of a quantitative manner and the low-boiling components of the sample can be more distinctly separated. This particular aspect is especially useful for analysis of mixtures having an exceptionally wide boiling point range. The following example, Example VI, is an illustration of such temperature programming.

*Example VI*

The products from the hydrogenation of a sample of hydroxypivalaldehyde were conducted substantially directly to a gas chromatographic column heating unit apparatus such as that illustrated in FIGURE 3 and introduced to the carrier gas stream entering the column through a suitable metering device in a sample 10 $\mu$l. in size. The chromatographic column was heated by a heating unit of the arrangement of FIGURES 1 and 2 to a temperature of 140° C. prior to the injection of the sample into the carrier gas stream. The flow rate of hydrogen carrier gas was 82.9 ml./min., and the gas chromatographic column was 6-ft. long and made of ¼-in. tubing packed with 30% Carbowax on 40–80 mesh Celite 545 (diatomaceous earth produced by Johns-Manville). During the passage of the sample through the chromatographic column, the column temperature was raised to 180° C. as the chromatogram developed, the chromatogram being the plot of the detector response versus the time in minutes. The extremely clear peaks given by the various components of the sample analyzed are recorded in FIGURE 8, which represents a graph of the detector response in millivolts versus the time in minutes as measured by a detector cell and bridge circuit and recorder arrangement such as that given schematically in FIGURE 3. The effectiveness of this temperature programming method is illustrated by the presence of the isobutanol peak separate and apart from the first or low-boiling components peak.

It is believed apparent from the foregoing description that we have provided a novel method and apparatus for the accurate analysis by gas chromatographic means of materials produced and used in various commercial operations. We have also provided a heating unit and column which have a relatively low heat capacity and thus a relative ease of heating and cooling.

The invention has been described in detail with particular reference to preferred embodiments thereof but it will be understood that various modifications can be effected within the scope of the invention as defined herein and described above.

We claim:

1. Apparatus comprising a cylindrical-shaped, coiled, high-temperature resistant column, a plurality of ceramic rods positioned substantially symmetrically around said column immediately radially outward therefrom, thereby forming a cylindrical-type framework, electric heat-conducting wires surrounding said ceramic rods in a spiral manner, said wires being supported by a plurality of circular ceramic collars, a cylindrical shell against which said collars are peripherally positioned located substantially immediately radially outward from said collars, said shell being closed at the ends, the inside wall of said shell having a heat-reflective surface, and said shell being adapted to open lengthwise along its diameter together with said collars and said supported wires, a substantially longitudinal extension of said column passing through a detector cell, a return, substantially longitudinal portion of said column connected to said extension of said column, said return portion positioned along a central axis within said cylindrical-shaped coiled column, and a plurality of openings in both ends of said cylindrical shell for entrance thereto and exit therefrom of said wires and entrances, extension, and return portions of said column.

2. Gas chromatographic apparatus comprising a gas chromatographic coiled column, means for injecting a sample into said column, means for carrying a controlled flow of carrier gas through said column, means for heating said column enclosing said column and comprising a radiant heating device comprising heat reflective walls annularly located immediately external to a series of ceramic rods which have electric wires wound thereabout in a spiral manner whereby the heat is confined substantially to the zone occupied by said enclosing heating means and said heating device enabled to heat said column rapidly to the operating temperature, said ceramic rods arranged radially outward from the chromatographic coiled column and surrounding same substantially concentrically, said radiant heating device being adapted to open lengthwise, thereby allowing rapid cooling, and detector means for measuring the components of said samples as they pass out of said column.

3. Gas chromatographic apparatus comprising in cooperative combination
   (1) substantially hemicylindrical stainless steel casing sections with heat reflective walls joined together by a piano-type hinge adapted to open said sections from their in-use tubular form,
   (2) ceramic spaghetti rods arranged in a circular pattern inside said casing sections, said rods extending in a substantially straight lengthwise manner between peripheral collar portions located at each end of said hemicylindrical sections,
   (3) heat conducting wire extending spirally around each of said ceramic spaghetti rods from end to end thereof,
   (4) means for introducing electrical current into said heat conducting wire,
   (5) said stainless steel casing sections being attached at one end thereof to a detector housing unit,
   (6) a coiled column with a return tube passing along the axis of said coiled column for return of carrier gas therethrough, said coiled column enclosed within said hemicylindrical casing sections and leading into said detector housing unit,
   (7) means for introducing carrier gas and sample into said column at the end opposite said detector housing unit, and
   (8) a detector cell within said detector housing unit connected with chromatographic recording means.

4. Gas chromatographic apparatus comprising a cylindrical radiant heating unit made up of two hemicylindrical walls hinged together along the locus of one end of a diameter of said cylindrical radiant heating unit with circumferentially placed heating rods wrapped with coiled wire connecting collar portions positioned inside said unit at each end of said hemicylindrical walls, said walls being heat reflective on the inside, spiral-shaped carrier gas conducting means centrally positioned within said heating unit, a carrier gas return channel axially positioned within said carrier gas conducting means, said heating unit connected at one extremity thereof to gas chromatographic detecting means, and means for injecting sample and carrier gas into said gas conducting means inside said heating unit.

References Cited in the file of this patent
UNITED STATES PATENTS

| | | |
|---|---|---|
| 2,379,820 | Mendez | July 3, 1945 |
| 2,450,563 | Rommel | Oct. 5, 1948 |

OTHER REFERENCES

Article: Drew et al., published in Vapor Phase Chromatography, Desty, 1956, Butterworths Scientific Publications, London, pages 214–219.